United States Patent [19]

Dodds et al.

[11] Patent Number: 5,063,874
[45] Date of Patent: Nov. 12, 1991

[54] CARBON SLURRY REGENERATION APPARATUS

[75] Inventors: Robert E. Dodds, San Diego, Calif.; Tsutomu Inose; Yoshimitsu Kato, both of Aichi, Japan

[73] Assignee: Sony Corporation, Japan

[21] Appl. No.: 523,586

[22] Filed: May 15, 1990

Related U.S. Application Data

[62] Division of Ser. No. 396,847, Aug. 22, 1989, Pat. No. 4,939,000.

[51] Int. Cl.⁵ .................. B05D 5/06; B01D 15/04
[52] U.S. Cl. .................. 118/602; 118/603; 118/312; 118/326; 118/DIG. 7; 210/263
[58] Field of Search .......... 118/602, 603, 312, 326, 118/DIG. 7; 427/345; 210/263, 683, 684, 692

[56] References Cited

U.S. PATENT DOCUMENTS 4,220,456  9/1980  Block .................. 55/85
4,481,087  11/1984  DiGiacomo ............ 210/684
4,596,659  6/1986  Nomura et al. ......... 210/669
4,680,123  7/1987  Wernicke et al. ....... 210/683

Primary Examiner—Richard V. Fisher
Assistant Examiner—Charles K. Friedman
Attorney, Agent, or Firm—Limbach, Limbach & Sutton

[57] ABSTRACT

An apparatus for producing a black matrix-type phosphor screen of a cathode ray tube is disclosed, which includes a carbon coating nozzle for coating a carbon slurry on a cathode ray tube panel, a tank for containing the carbon slurry, a supplying system for supplying the carbon slurry from the carbon slurry tank into the carbon coating nozzle and a collecting system for collecting excess carbon slurry produced from the carbon coating nozzle back into the carbon slurry tank, and a carbon slurry regenerating device using an ion-exchange resin is provided. The regenerating device can be placed in at least one of the supplying system, the collecting system and the carbon slurry tank.

5 Claims, 3 Drawing Sheets

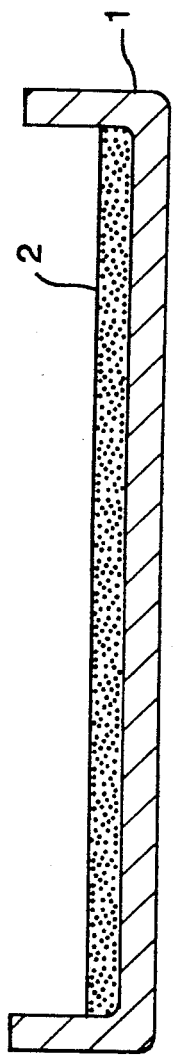
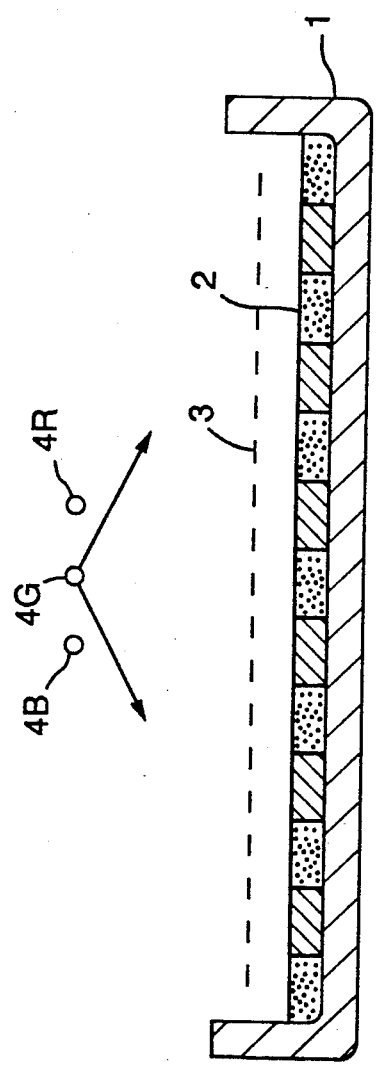
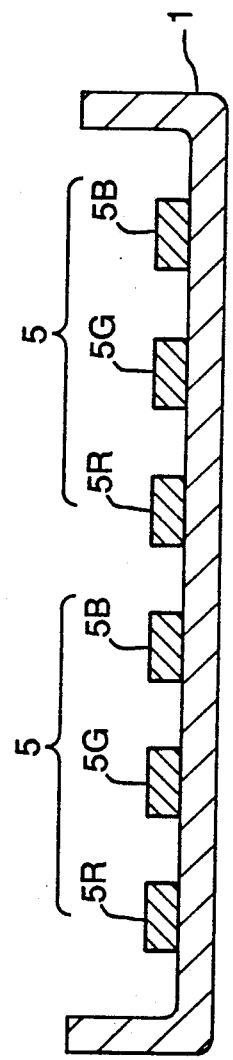
FIG. 1A (PRIOR ART)
FIG. 1B (PRIOR ART)
FIG. 1C (PRIOR ART)
FIG. 1D (PRIOR ART)

CARBON SLURRY REGENERATION APPARATUS

This is a divisional of application Ser. No. 07/396,847, filed Aug. 22, 1989, now U.S. Pat. No. 4,939,000.

TECHNICAL FIELD OF THE INVENTION

The present invention relates to an apparatus for producing a black matrix-type phosphor screen of a cathode ray tube.

BACKGROUND OF THE INVENTION

A color cathode ray tube generally employs a black matrix-type phosphor screen in which a light-absorption layer (so-called black matrix) is formed among red, green and blue phosphor stripes (or dots) in order to improve the contrast thereof.

The black matrix-type phosphor screen is generally formed as follows.

As shown in FIG. 1A, the inner surface of a cathode ray tube panel 1 is first rinsed by an aqueous hydrofluoric acid solution. Then, a polyvinyl alcohol type photosensitive film 2, made by adding ammonium dichromate to polyvinyl alcohol, is coated on the inner surface of the cathode ray tube panel 1 and then dried.

As shown in FIG. 1B, a color selecting mechanism, for example, an aperture grill 3 is then used as an optical mask to expose the photosensitive film 2 to ultraviolet rays. In this exposing process, the photosensitive film 2 is exposed three times in the sequential order of, for example, green, blue and red colors. In FIG. 1B, reference numerals 4R, 4G and 4B designate exposing light sources corresponding to the red, green and blue colors, respectively.

Thereafter, the photosensitive film 2 is developed by some suitable process such as rinsing with water or the like to obtain a resist layer, in this example, a resist layer 5 (5R, 5G, 5B) of stripe-configurations on the inner surface of the cathode ray tube panel 1 at positions corresponding to the respective red, green and blue colors as shown in FIG. 1C.

After developing the film 2 with water, boric acid is dispensed onto the panel including the resist layer 5, producing very straight edges on the PVA and thus eventually to the carbon stripes (see FIG. 1D). Then, they are dried. This process will be hereinafter simply referred to as a hardening-process. In the hardening-process, a hardening agent used thereon may be generally a boric acid aqueous solution or other aqueous solutions such as an aqueous tannic acid solution.

Then, as shown in FIG. 1E, a carbon slurry 6 is coated on the whole face of the inner surface including the resist layers 5R, 5G and %B, and then dried. At the next step, water 7 is sprayed to uniformly wet the carbon-coated surface as shown in FIG. 1F. This wetting-process is carried out in order to provide a buffer against the extremely strong oxidant which, upon application, soaks through the carbon layer and dissolves the underlying PVA by breaking up the polymerized chains, thus also removing any carbon overlying it.

Then, the resist layer 5 is swollen and the developing-treatment is performed by means of, for example, water-spray, to remove the resist layer 5 and the carbon-coated layer formed on the resist layer 5, thus carbon-stripes or black matrixes 8 of predetermined pattern are formed on the inner surface of the cathode ray tube panel 1 as shown in FIG. 1G.

Thereafter, a phosphor slurry of, for example, green color is coated thereon and dried. Then, the coated green phosphor slurry is exposed by means of the aperture grill 3 (see FIG. 1B) and developed so as to form a green phosphor stripe 9G on the inner surface of the cathode ray tube panel 1 at its predetermined portion where the black matrix 8 is not formed. In a like manner, a blue phosphor stripe 9B and a red phosphor stripe 9R are formed on the inner surface of the cathode ray tube panel 1 at its predetermined portions, thus a color phosphor screen 10 of black matrix-type is formed as shown in FIG. 1H.

In the above-mentioned carbon coating process, through not shown in the figures, a carbon slurry from a carbon slurry tank is supplied through a supplying-system pipe to carbon-coating means, i.e., a nozzle. The carbon slurry is then ejected from the nozzle onto the inner surface of the cathode ray tube panel. After the carbon-coating film is uniformly coated on the inner surface of the cathode ray tube panel, the excess carbon slurry is collected back into the carbon slurry tank through a collection-system pipe.

Generally, when the carbon slurry used in this coating process is collected and continuously recycled, the viscosity of the carbon slurry increases. At a certain point in time, the carbon slurry becomes unsuitable for use in the coating process because the carbon-coated film does not dry well after application to the Panel 1 because of the increase in the viscosity of the carbon slurry. For example, if the viscosity of the carbon slurry is increased as high as four times its original viscosity, the thickness of the carbon-coated film is increased three times, making the carbon-coated film increasingly difficult to dry because it does not dry evenly and sufficiently. When the carbon-coated film that should be left in the afore-mentioned developing-process is too viscous, there is undesirable peeling. This phenomenon occurs especially on the peripheral portions of the panel.

In the existing process, in order to control the viscosity of the carbon slurry so that is always falls in a constant range, each time the carbon slurry is coated on a predetermined number of panels, the carbon slurry exhaust port of the carbon slurry tank is opened to dump some of the slurry to allow a predetermined liquid level to remain in the tank. Thereafter, fresh carbon slurry is added to the carbon slurry tank up to its predetermined liquid level. This purging technique increases the amount of carbon slurry consumed. The manufacturing cost of the black matrix of the color cathode ray tube is inevitably increased.

SUMMARY OF THE INVENTION

According to one aspect of the present invention, there is provided a method for regenerating a carbon slurry used to produce a black matrix-type phosphor screen of a cathode ray tube. Excess carbon slurry, left after the completion of a carbon-coating process onto a cathode ray tube panel, is collected and then regenerated by contacting the collected carbon slurry with ion-exchange resin.

According to another aspect of the present invention, there is provided an apparatus for producing a black matrix-type phosphor screen of a cathode ray tube comprising: carbon coating means for coating a carbon slurry on a cathode ray tube panel; a tank for containing said carbon slurry; a supplying system for supplying said carbon slurry from said carbon slurry tank into said carbon coating means; a collecting system for collecting an extra carbon slurry produced from said carbon coating means into said carbon slurry tank; and carbon slurry regenerating means using an ion-exchange resin, wherein said regenerating means is provided in at least one of said supplying system, said collecting system and said carbon slurry tank.

It is therefore an object of the present invention to provide an improved method for regenerating carbon slurry used to produce a black matrix-type phosphor screen of a cathode ray tube.

It is another object of the present invention to provide a method for regenerating a carbon slurry used to produce a black matrix-type phosphor screen of a cathode ray tube which can suppress an increase in the viscosity of a carbon slurry.

It is still another object of the present invention to provide a method for regenerating a carbon slurry used to produce a black matrix-type phosphor screen of a cathode ray tube by which a collected carbon slurry can be used repeatedly and cyclically.

It is a further object of the present invention to provide an improved apparatus for producing a black matrix-type phosphor screen of a cathode ray tube.

It is a still further object of the present invention to provide an apparatus for producing a black matrix-type phosphor screen of a cathode ray tube which can suppress an increase in viscosity of a carbon slurry.

It is a still further object of the present invention to provide an apparatus for producing a black matrix-type phosphor screen of a cathode ray tube by which collected excess carbon slurry can be used repeatedly and cyclically.

It is a yet further object of the present invention to provide an apparatus for producing a black matrix-type phosphor screen of a cathode ray tube which can decrease the manufacturing cost of a black matrix-type phosphor screen.

These, and other object, features and advantages of the present invention will become apparent from the following detailed description of the preferred embodiment, to be taken in conjunction with the accompanying drawings, in which like reference numerals identify like elements and parts.

BRIEF DESCRIPTION OF THE FIGURES

FIGS. 1A to 1H are schematic diagrams of prior art processes for producing a black matrix-type phosphor screen and being useful for explaining the present invention, respectively.

DETAILED DESCRIPTION OF THE INVENTION

Prior to a description of a preferred embodiment of the invention, the principle of the present invention will be described briefly.

Although our invention is not to b limited by this explanation, it is our present understanding that the reason for an increased viscosity of a carbon slurry collected after its application in a process for producing a black matrix-type phosphor screen can be considered as follows. Material coated on the inner surface of the panel before the carbon slurry is coated on the inner surface becomes dissolved in the collected carbon slurry. The carbon slurry is thereby aggregated so that the viscosity of the carbon slurry is increased. The materials which become dissolved in the carbon slurry, are polyvinyl alcohols (PVA), an ammonium dichromate (ADC), a boric acid and a tannic acid that act as hardening agent.

In accordance with the present invention, the carbon slurry which is collected after the carbon slurry has been coated onto the cathode ray tube panel having a hardening-processed resist layer formed on its inner surface is passed through an ion-exchange resin so that the dissolved material contained in the carbon slurry which contributes to its increased viscosity can be removed chemically. Thus, the viscosity of the collected carbon slurry can be decreased by chemical removal of aggregation agents and thereby regenerated to have substantially the same qualities as fresh carbon slurry.

Figure 2:
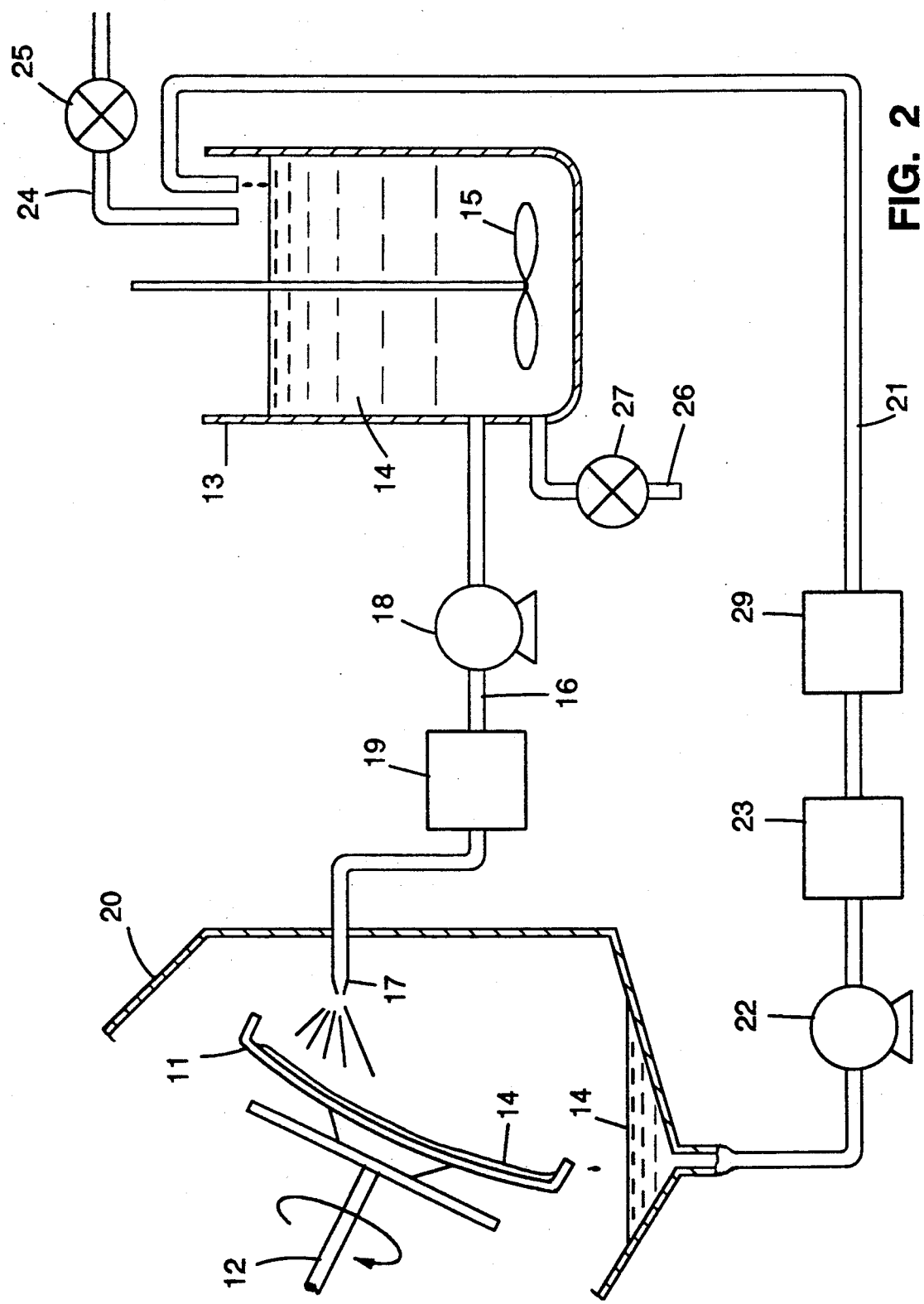
FIG. 2 is a schematic diagram showing an embodiment of an apparatus for producing a black matrix-type phosphor screen according to the present invention.

With reference to the schematic diagram of FIG. 2, an example of an apparatus for producing a black matrix-type phosphor screen of a cathode ray tube that employs a method of regenerating a carbon slurry according to the present invention is described.

Figure 1E:
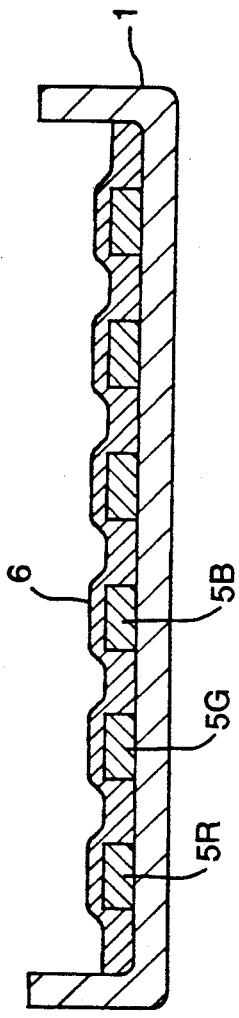
Figure 1F:
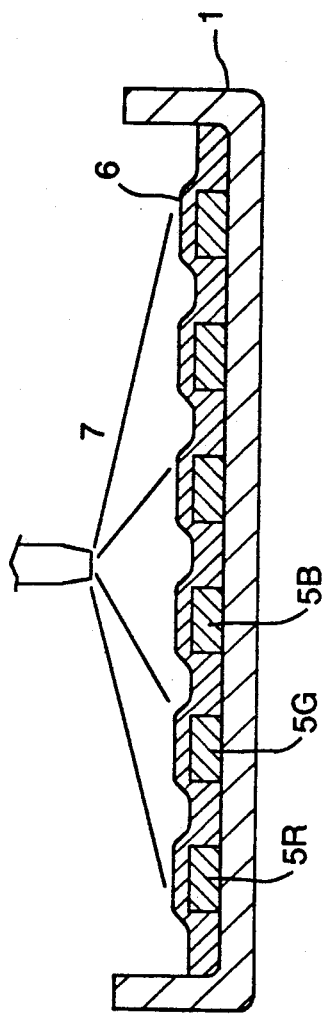
Figure 1G:
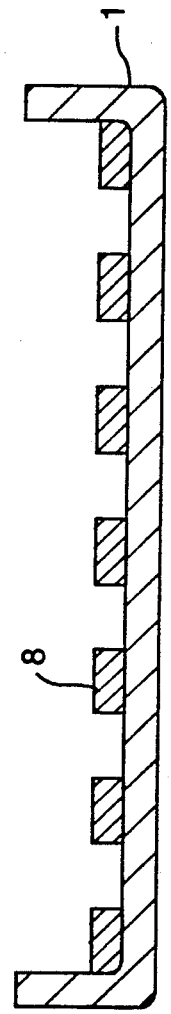
Figure 1H:
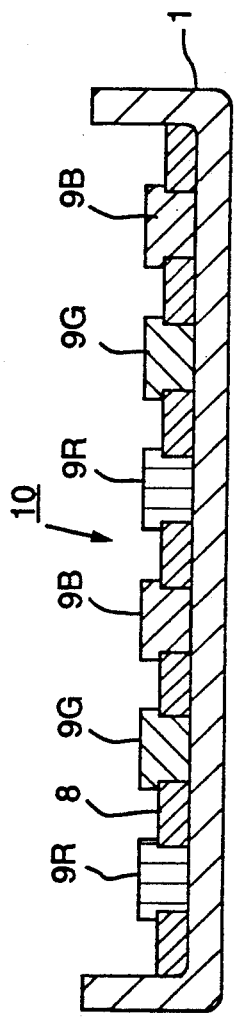

There is a cathode ray tube panel 11 on which is coated carbon slurry (and other components) that are used to produce a black matrix-type phosphor screen. This cathode ray tube panel 11 is rotatably supported by a rotary arm 12. On the inner surface of the panel 11, there is formed a resist layer 5 of a predetermined pattern that has undergone the hardening-treatment by means of, for example, the aqueous boric acid solution as shown in, and described with reference to FIG. 1D.

Carbon slurry tank 13 accommodates a carbon slurry 14. The carbon slurry tank 13 incorporates therein stirring means 15 for stirring the carbon slurry 14. The carbon slurry 14 from the tank 13 is introduced through a supplying-system pipe 16 to a nozzle section 17 that serves as carbon coating means positioned in an opposing relation to the inner surface of the cathode ray tube panel 11. A pump 18 and a filter 19 are interposed on the supplying-system pipe 16 at its midway. On the side of the cathode ray tube panel 11, there is located a cover member 20 that surrounds the panel 11. Thus, of the carbon slurries ejected from the nozzle section 17 towards the inner surface of the cathode ray tube panel 11, the excess carbon slurry 14 is stored in the lower portion of the cover member 20. The excess carbon slurry 14 is collected into the carbon slurry tank 13 via a collecting-system pipe 21.

A pump 22 and a filter 23 are interposed on the collecting-system pipe 21 at its midway. The filters 19 and 23 are adapted to remove materials that are aggregated in the carbon slurry by dusts and so on. In FIG. 2, reference numeral 24 designates a pipe for supplying new slurry into the carbon slurry tank 13 and reference numeral 26 designates a pipe through which tank 13 is abandoned to the outside of the tank 13. Reference numerals 25 and 27 designate open and/or closed valves, respectively.

Accordingly, in this particularly preferred embodiment, a column 29 filled with a negative ion-exchange resin is located in the midst of the collecting-system pipe 21, particularly, at the position behind the filter 23. This column 29 services as carbon slurry regenerating means because it chemically removes materials which lead to carbon aggregation and resulting viscosity increase.

The carbon slurry 14 used in this embodiment is a carbon slurry made by the use of AQUADAG CARBON (tradename of carbon manufactured by Acheson Japan Limited.). The compositions of carbon solution and ready-mixed carbon slurry solution are indicated in Table 1,

TABLE I

| Composition of Carbon Solution | |
|---|---|
| Carbon solution | Ready-mixed carbon slurry |
| Amount of solid carbon: 22% | Amount of solid carbon: 5.5% to 7.5% |
| Organic dispersing agent: very small amount | Organic dispersing agent: very small amount |
| | Surface-active agent: small amount |
| Water: remaining portion | Water: remaining portion |

In the apparatus shown in FIG. 2, the carbon slurry 14 within the carbon slurry tank 13 is conveyed to the supplying-system pipe 16 by pump 18 through the filter 19 to the nozzle section 17. From the nozzle section 17, the carbon slurry 14 is ejected onto the inner surface of the rotating panel 11 and is uniformly coated thereon to a predetermined film thickness. The extra carbon slurry 14 ejected onto the panel 11 is stored in the lower portion of the cover member 20 and collected into the carbon slurry tank 13 through the collecting-system pipe 21 by the pump 22. At that time, the collected carbon slurry 14 is passed through the column 29 filled with the negative ion-exchange resin located behind the filter 23 so that boric acid mixed into the collected carbon slurry can be chemically removed with the result that the viscosity of the collected carbon slurry is decreased. That is, the carbon slurry is regenerated and then returned to the carbon slurry tank 13.

In this way, the carbon slurry 14 is regenerated and used repeatedly and cyclically without any significant increase in slurry viscosity over the course of these cycles. When the amount of the carbon slurry 14 within the carbon slurry tank 13 becomes less than a predetermined amount, fresh carbon slurry 14 is supplied into the carbon slurry tank 13 from supply pipe 24.

Practical examples of regenerating collected carbon slurry by the use of negative ion-exchange resin will be described next.

EXAMPLE 1

Carbon slurry whose viscosity was increased after the carbon slurry 14 was ejected onto and uniformly coated on the inner surface of the cathode ray tube panel 11 having the resist layer which underwent the hardening-treatment by the boric acid as collected and then regenerated by the column 29 filled with a strong base negative ion-exchange resin that was made by Rohm and Haas Co., Ltd. The collected carbon slurry before being regenerated contained boric acid at a concentration 200 ppm. The resulting viscosity of the collected carbon slurry was increased by about four times that of fresh carbon slurry. While the regenerated carbon slurry contained 0.5 ppm boric acid after the regeneration, the viscosity of the regenerated carbon slurry was lowered back to its original value. Thus, regenerated carbon slurry could be used again in the carbon-coating process similarly to fresh carbon slurry.

EXAMPLE 2

A regeneration-treatment similar to that described in Example 1 was performed. The negative ion-exchange resin filled into the column 29 was a boric acid selective, weak base negative ion-exchange resin, such as a boric acid, selective chelate resin that was made by Rohm and Haas Co., Ltd. After the collected carbon slurry in this example was passed through the ion exchange resin, the collected carbon slurry wa regenerated.

The negative ion-exchange resin in column 29 from Examples 1 to 2 can be repeatedly used after being treated by an aqueous caustic soda solution.

While in the embodiment of the present invention shown in FIG. 2, the column 29 filled with the negative ion-exchange resin is located in the midst of the collecting-system pipe 21, column 29 may also be located in the midst of the supplying-system pipe 16. The effect of the regeneration-treatment may also be achieved by supplying the negative ion-exchange resin directly into the carbon slurry tank 13. Further, the negative ion-exchange resin may simultaneously be provided at a plurality of places, for example, in the collecting-system pipe 21, the supplying-system pipe 16 and the carbon slurry tank 13.

While in the above-mentioned embodiment in which aqueous the boric acid solution is used as a hardening-treatment agent for the resist layer, the boric acid is mainly removed from the collected carbon slurry by the ion-exchange resin. Thus, the collected carbon slurry is regenerated. It is part of our invention, however, that even when other hardening-treatment agents (for example, a tannic acid aqueous solution) are used, the collected carbon slurry can be regenerated by means of an ion-exchange resin.

According to the method of regenerating carbon slurry used to produce a black matrix-type phosphor screen, the hardening-treatment agent or other aggregation causing agent contained in the collected carbon slurry can be removed by passing the collected carbon slurry through the ion-exchange resin so that the viscosity of the carbon slurry can be reduced to the viscosity of fresh carbon slurry. Therefore, the collected carbon slurry can be used again.

Moreover, according to the apparatus for producing a black matrix-type phosphor screen of the present invention, since the carbon slurry regenerating means using the ion-exchange resin is provided in at least one of the supplying system, collecting-system of the carbon slurry and the carbon slurry tank, the collected carbon slurry can be regenerated and hence the carbon slurry can be used cyclically. Therefore, the waste consumption of the carbon slurry can be decreased and hence, the manufacturing cost of the black matrix-type phosphor screen of a cathode ray tube can be decreased.

It should be understood that the above description is presented by way of example of a single preferred embodiment of the invention and it will be apparent that many modifications and variations thereof could be effected by one with ordinary skill in the art without departing from the spirit and scope of the novel concepts of the invention so that the scope of the invention should be determined only by the appended claims.

We claim:

1. An apparatus for producing a black matrix-type phosphor screen of a cathode ray tube comprising:
   (a) carbon coating means for coating a carbon slurry on a cathode ray tube panel;
   (b) a tank for containing said carbon slurry;
   (c) a supplying system for supplying said carbon slurry from said carbon slurry tank into said carbon coating means;
   (d) a collecting system for collecting excess carbon slurry produced from said carbon coating means into said carbon slurry tank; and (e) carbon slurry regenerating means using an ion-exchange resin, wherein said regenerating means is provided in at least one of said supplying system, said collecting system and said carbon slurry tank.

2. An apparatus according to claim 1, in which said ion-exchange resin is a negative ion-exchange rein.

3. An apparatus according to claim 2, in which said negative ion-exchange resin is a strong base negative ion-exchange resin.

4. An apparatus according to claim 3, in which said negative ion-exchange resin is a boric acid selective weak base negative ion-exchange resin.

5. An apparatus according to claim 4, in which said boric acid selective weak base negative ion-exchange resin is a boric acid selective chelate resin.

* * * * *